United States Patent
Wilson et al.

(10) Patent No.: US 6,749,136 B1
(45) Date of Patent: Jun. 15, 2004

(54) ENHANCED SPRINKLER VALVING APPARATUS AND METHOD

(75) Inventors: Chadwick L. Wilson, Woods Cross, UT (US); Alan John Smith, Bountiful, UT (US); Edwin McAuley, Quarry Bay (HK)

(73) Assignee: Orbit Irrigation Products, Inc., Bountiful, UT (US)

( * ) Notice: Subject to any disclaimer, the term of this patent is extended or adjusted under 35 U.S.C. 154(b) by 14 days.

(21) Appl. No.: 10/304,283

(22) Filed: Nov. 26, 2002

(51) Int. Cl.$^7$ .............................. B05B 1/30; F16K 31/00
(52) U.S. Cl. ..................................... 239/569; 251/335.2
(58) Field of Search ................................. 239/200, 201, 239/203, 204, 569, 571; 251/30.05, 44, 45, 335.2

(56) References Cited

U.S. PATENT DOCUMENTS

| | | | | |
|---|---|---|---|---|
| 3,782,682 A | * | 1/1974 | Lale .......................... | 251/61.1 |
| 4,607,627 A | * | 8/1986 | Leber et al. ................ | 601/162 |
| 4,671,485 A | * | 6/1987 | Saarem ..................... | 251/30.03 |
| 6,193,212 B1 | * | 2/2001 | Ohmi et al. ........... | 251/129.16 |
| 6,394,415 B1 | * | 5/2002 | Ohmi et al. ........... | 251/129.16 |

OTHER PUBLICATIONS

Printout of an Approximate Computer Model of a Competitive Device Sold by DIG Irrigation Products of Vista, CA sometime before Nov. 26, 2002.

* cited by examiner

Primary Examiner—Henry Bennett
Assistant Examiner—Malik N. Drake
(74) Attorney, Agent, or Firm—Madson & Metcalf

(57) ABSTRACT

A sprinkler valving apparatus and method are provided. An irrigation system has a plurality of valves designed to be electrically activated by a control unit. Each valve may have a first diaphragm that is flexible to control irrigation water flow through the valve. Each of the valves may have a solenoid isolated from irrigation water within the valve by a second diaphragm. The first and second diaphragms are separated by an interior divider with an orifice that can be blocked or unblocked via flexure of the second diaphragm to trigger motion of the first diaphragm. The second diaphragm is actuated by a magnetically actuatable plunger of the solenoid, which extends through an aperture of an interior retainer to reach the second diaphragm. The second diaphragm has a peripheral ring to ensure that it is movable even when negative outlet pressure is applied to the valve.

40 Claims, 5 Drawing Sheets

ENHANCED SPRINKLER VALVING APPARATUS AND METHOD

BACKGROUND OF THE INVENTION

1. Field of the Invention

The present invention relates to irrigation systems and methods. More specifically, the present invention relates to an apparatus and method for controlling water flow in an irrigation system.

2. Description of Related Art

Irrigation not only permits foodstuffs to be grown, but also enables the cultivation of attractive plant life that otherwise would not have sufficient water to thrive. Many households now utilize sprinkler systems to provide irrigation in a comparatively uniform and trouble-free manner.

Often, a control unit such as a timer is used to regularly initiate operation of the sprinkler system to automatically provide the desired distribution of irrigation water. The timer is electrically connected to a plurality of electrically operated valves, each of which is able to permit water to flow into a corresponding zone of the sprinkler system. The valves must be individually activated so that the entire pressure and flow rate available will be focused on each zone, in turn.

Many known valves utilize an electrically driven actuator such as a solenoid. In many configurations, the solenoid has a plunger that can be extended to plug a hole of a diaphragm, and to press the diaphragm toward an outlet opening. Upon extension, the plunger keeps the diaphragm closed to block water passage through the valve. Upon retraction, the plunger permits water to flow through the hole in the diaphragm and through the outlet opening, thereby reducing water pressure between the diaphragm and the solenoid to induce the diaphragm to move away from the outlet opening, thereby opening the valve. Often, the solenoid is a "latching" or "bi-stable" solenoid, which means that the plunger remains in the extended or retracted positions without requiring continuous power.

Unfortunately, such valves have a number of disadvantages arising from the fact that the solenoid is continuously exposed to the irrigation water. For example, exposure to water requires the use of corrosion resistant materials, such as stainless steels, for the plunger and the interior chamber of the solenoid. These materials add significantly to the cost of the solenoid. A significant danger of corrosion of the chamber or plunger may yet remain, particularly if the irrigation water is oxygenated or polluted.

Hence, it would be an advancement in the art to provide a valving apparatus and method that provides a high degree of corrosion resistance without requiring the use of a solenoid made from corrosion resistant materials. It would be a further advancement in the art to provide a sprinkler valve that is simple, inexpensive, easy to assemble, and reliable in operation.

SUMMARY OF THE INVENTION

The apparatus of the present invention has been developed in response to the present state of the art, and in particular, in response to the problems and needs in the art that have not yet been fully solved by currently available sprinkler valving systems and methods. Thus, it is an overall objective of the present invention to provide sprinkler valves and associated methods that remedy the shortcomings of the prior art.

To achieve the foregoing objective, and in accordance with the invention as embodied and broadly described herein in the preferred embodiment, an irrigation system is used to irrigate an area. The irrigation system has a valving system designed to control flows of an irrigation liquid, such as water, to a plurality of water distribution units such as sprinklers. The sprinklers receive water from a plurality of distribution conduits, each of which is in communication with a valve assembly. Each valve assembly has a fluid transfer portion and an actuator portion designed to actuate elements within the valve housing to move the valve assembly between an open configuration and a closed configuration.

Each valve assembly also has a pair of wires that conveys a valve activation signal to the actuator to move the valve assembly between the open and closed configurations. The valve assemblies may be connected to a feeder conduit to form a manifold that receives water from a main line. The manifold may be disposed underground, within a manifold box covered by a lid. Alternatively, the manifold may be attached to an above-ground spigot for use in a hose bib irrigation system. Control unit wires extend from the valve wires to a control unit, such as a timer.

Each valve assembly includes an inlet conduit and an outlet conduit, both of which are connected to a valve. The valve has a conduit junction that permits water to pass between the inlet and outlet conduits when the valve is in an open configuration. Water is unable to pass through the conduit junction when the valve is in the closed configuration. The conduit junction has a primary outflow passageway and a secondary outflow passageway.

The valve also includes a first diaphragm, an interior divider, a second diaphragm, an interior retainer, and a solenoid. The first diaphragm is sandwiched between the conduit junction and the interior divider such that the first diaphragm is flexible to block or unblock the primary outflow passageway. A first chamber is defined by the first diaphragm and the interior divider. The first diaphragm has a hole designed to permit irrigation water to flow into the first chamber at a limited flow rate.

The interior divider has an orifice designed to permit irrigation water to leave the first chamber at a flow rate greater than that of entry through the hole of the first diaphragm when the orifice is open. The second diaphragm is sandwiched between the interior divider and the interior retainer such that the second diaphragm is flexible to block or unblock the orifice. A second chamber is defined by the interior divider and the second diaphragm.

The solenoid is disposed on the opposite side of the interior retainer from the second diaphragm. The solenoid has a magnetically actuatable plunger with a post positioned to extend through an aperture of the interior retainer to reach the second diaphragm. Thus, the magnetically actuatable plunger can be moved to press against the second diaphragm, thereby causing the second diaphragm to abut the orifice of the interior divider to block fluid communication between the first and second chambers.

When the second diaphragm abuts the orifice of the interior divider, pressure within the first chamber will tend to equalize with that of the inlet conduit. As a result, the first diaphragm is pressed against the primary outflow passageway of the conduit junction. The valve is then in the closed configuration.

In order to open the valve, the plunger is withdrawn by the solenoid. Thus, the second diaphragm is permitted to withdraw from the orifice, thereby unblocking the orifice to permit fluid communication between the two chambers. Water pressure within the first chamber is reduced as water moves from the first chamber to the second chamber. The interior divider has an outflow passageway in communication with the secondary outflow passageway of the conduit junction. Thus, water vents relatively freely from the first chamber, thereby reducing its pressure.

In response to reduction of water pressure within the first chamber, the first diaphragm deflects to the open position. Water is then able to flow through the primary outflow conduit of the conduit junction to reach the outlet conduit, and subsequently, the corresponding distribution conduit and water distribution unit(s) The first diaphragm remains open until the second diaphragm is again actuated to close the orifice Throughout the process, the second diaphragm acts as a seal to isolate the solenoid from irrigation water.

According to one embodiment, the second diaphragm has a peripheral ring that also abuts the interior divider, around the orifice. The peripheral ring is drawn into sealing engagement with the interior divider if the outlet conduit is at a pressure lower than that of the solenoid interior. This isolates the orifice from the potential vacuum to ensure that the second diaphragm is able to withdraw from the orifice to trigger movement of the first diaphragm to open the valve.

Such a valve assembly may be easily manufactured through the use of a number of steps. According to one method, the inlet conduit, outlet conduit, and conduit junction are injection molded or otherwise unitarily formed. The first diaphragm is inserted into engagement with the conduit junction. The interior divider is then positioned such that the first diaphragm is sandwiched between the interior divider and the conduit junction The second diaphragm is positioned against the interior divider. The interior retainer is then disposed such that the second diaphragm is sandwiched between the interior divider and the interior retainer.

The solenoid is then installed in such a manner that the magnetically actuatable plunger is able to press against the second diaphragm when the valve is to be moved to the closed configuration. A cap is attached to the conduit junction in such a manner that the cap keeps the first diaphragm, the interior divider, the second diaphragm, the interior retainer, and the solenoid in place. The solenoid is disposed outside the interior retainer The aperture of the interior retainer is isolated from water by the second diaphragm; hence, the solenoid is also isolated from the irrigation water.

Through the use of the apparatus and method of the invention, valve solenoids may be substantially isolated from the irrigation water Thus, irrigation valves may be more easily and economically produced Furthermore, such irrigation valves may operate more reliably, with a smaller danger of failure due to corrosion These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured integrally, i.e., as a single piece, without requiring the assembly of multiple pieces. Multiple parts may be integrally formed with each other if they are formed from a single workpiece.

Figure 1:
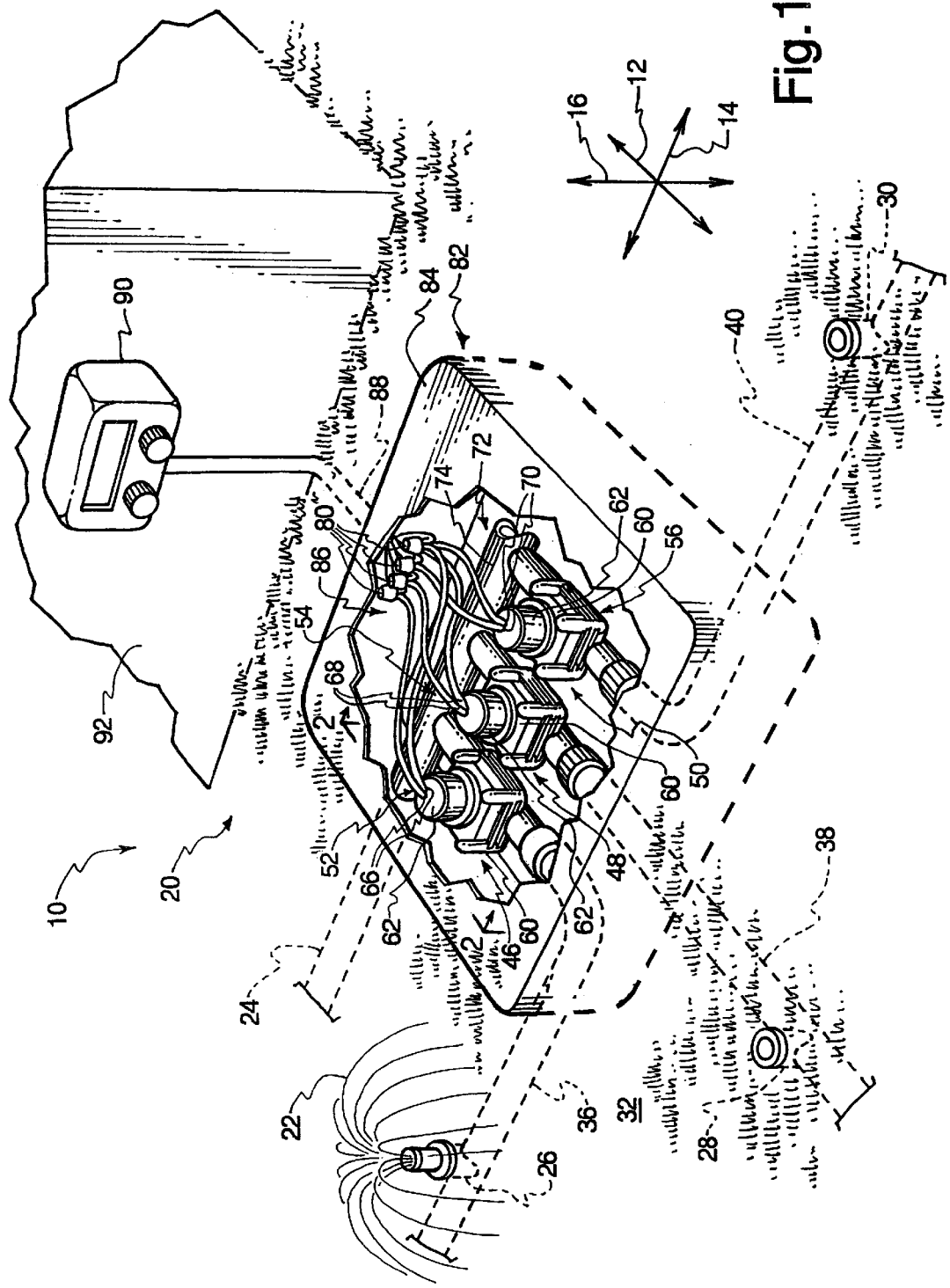
FIG. 1 is a perspective view of a portion of an irrigation system according to one embodiment of the invention, showing the lid of the manifold box partially cut away to reveal the manifold and associated conduits.

Referring to FIG. 1, a perspective view depicts an irrigation system 10 according to one embodiment of the invention. The irrigation system 10 has a longitudinal direction 12, a lateral direction 14, and a transverse direction 16. The irrigation system 10 incorporates a valving system 20, which will be described in greater detail subsequently.

The irrigation system 10 is designed to receive an irrigation liquid, such as water 22, via a main line 24. "Irrigation liquid" refers to any liquid that can be used to promote plant growth. Thus, the irrigation liquid need not be only water as in FIG. 1, but may, for example, include fertilizers, pesticides, or other additives. The water 22 is distributed by a plurality of water distribution units over a patch of land designated for plant growth. "Water distribution unit" encompasses a variety of devices used to spread water, such as pop-up sprinkler heads, rotary sprinklers, bubblers, drip irrigation systems, and the like. The irrigation system 10 includes water distribution units in the form of a first sprinkler head 26, a second sprinkler head 28, and a third sprinkler head 30. The sprinkler heads 26, 28, 30 are arrayed to irrigate an area 32.

The first, second and third sprinkler heads 26, 28, 30 are supplied with water by first, second and third distribution conduits 36, 38, 40, respectively. Each of the distribution conduits 36, 38, 40 may extend further-to supply additional water distribution units (not shown). In this application, a "conduit" is any structure capable of conducting a fluid under pressure from one location to another.

Water flow to the first, second, and third distribution conduits 36, 38, 40 is controlled by a first valve assembly 46, a second valve assembly 48, and a third valve assembly 50, respectively. The valve assemblies 46, 48, 50 may optionally operate to permit water flow to only one of the conduits 36, 38, 40 at any given time, so that each conduit 36, 38, 40, in turn, receives the full pressure and flow rate of water from the main line 24. The first, second, and third valve assemblies 46, 48, 50 have a first valve 52, a second valve 54, and a third valve 56, respectively.

As depicted in FIG. 1, the first valve assembly 46 is in the open configuration to supply water to the first sprinkler head 26 via the first conduit 36. The second and third valve assemblies 48, 50 are in the closed configuration so no significant amount of water flows into the second and third conduits 38, 40, and the second and third sprinkler heads 28, 30 are inactive.

Each of the valves 52, 54, 56 has a fluid transfer portion 60 in fluid communication with the associated distribution conduit 36, 38, or 40. The fluid transfer portion 60 contains one or more elements that block or unblock water flow through the fluid transfer portion 60. Thus, each of the valves 52, 54, 56 has a closed configuration, in which water flow is blocked, and an open configuration, in which water flow is comparatively freely penmitted.

Each of the valve assemblies 46, 48, 50 also has an actuator portion 62-attached to the fluid transfer portion 60. The actuator portion 62 moves the interior elements of the fluid transfer portion 60 to move the valve assembly 46, 48, 50 between the open and closed configurations. The actuator portion 62 may include an electrically operated device such as a linear or rotary solenoid, piezoelectric actuator, or electric motor. The valve assemblies 46, 48, 50 also include first valve wires 66, second valve wires 68, and third valve wires 70, respectively. Each set of valve wires 66, 68, 70 is coupled to the actuator portion 62 of the corresponding valve 52, 54, 56.

In this application, the term "valve" generally refers to the combination of the fluid transfer portion 60 and the actuator portion 62. The tern "valve" is not limited-to the embodiment shown, but may include a wide variety of actuator and fluid transfer portion combinations.

The valve assemblies 46, 48, 50 are interconnected to form a manifold 72, to which the main line 24 and the distribution conduits 36, 38,40 are attached. More precisely, the manifold 72 includes a feeder conduit 74 that receives water from the main line 24 at one end. The valve assemblies 46, 48, 50 are arranged generally perpendicular to the feeder conduit 74 to receive the water. The manifold 72 is disposed within a manifold box 82, which may be disposed generally underground, as depicted. The manifold box 82 has a lid 84 designed to provide access to the manifold 72 for repairs or maintenance.

A plurality of control unit wires 86 are connected to valve wires 66, 68, 70. Except at the ends, the control unit wires 86 are covered by a sheath 88 designed to gather and protect the control wires 86. The control unit wires 86 extend from the valve wires 66, 68, 70 to a control unit designed to transmit valve activation signals through the control wires 86. As depicted, the valve wires 66, 68, 70 are connected to the control unit wires 86 via conventional wire nuts. If desired, the control wires 86 may alternatively be coupled to the valve wires 66, 68, 70 via some type of electrical junction unit.

The control unit may take the form of a timer 90, as illustrated in FIG. 1. The timer 90 transmits the valve activation signals via the control unit wires 86 according to a schedule established by a user. The phrase "control unit" is not limited to a timer, but may,include any other device that transmits a valve activation signal. Such devices include simple switches, remote receivers, control system processors designed to measure variables and control operation of the irrigation system 10 based on those variables, and the like. The timer 90 may be attached to a wall 92 near the manifold box 82, as shown, or may be disposed at a remote location.

The configuration of FIG. 1 is not the only application in which valves according to the invention may be used. Valves such as the valves 52, 54, 56 may be used in other types of irrigation systems. For example, the valves 52, 54, 56 may be incorporated into a hose bib system. Thus, the valves 52, 54, 56 may be attached to a common above-ground garden spigot, either individually or as part of a differently configured manifold. The distribution conduits 36, 38, 40 may be effectively replaced with hoses or other above-ground irrigation water lines. One or more timers may be incorporated into the housings of the valves 52, 54, 56 to provide a simple and compact irrigation control system.

In the embodiment depicted in FIG. 1, the valves 52, 54, 56 are uniquely designed to avoid water contact with the actuator portions 62. The actuator portions 62 are effectively sealed from the fluid transfer portions 60 so that corrosion resistant materials need not be used in the actuator portions 62. The manner in which such sealing is performed and the operational steps followed by the valves 52, 54, 56 will be shown and described in greater detail in connection with FIGS. 2 through 5.

Figure 2:
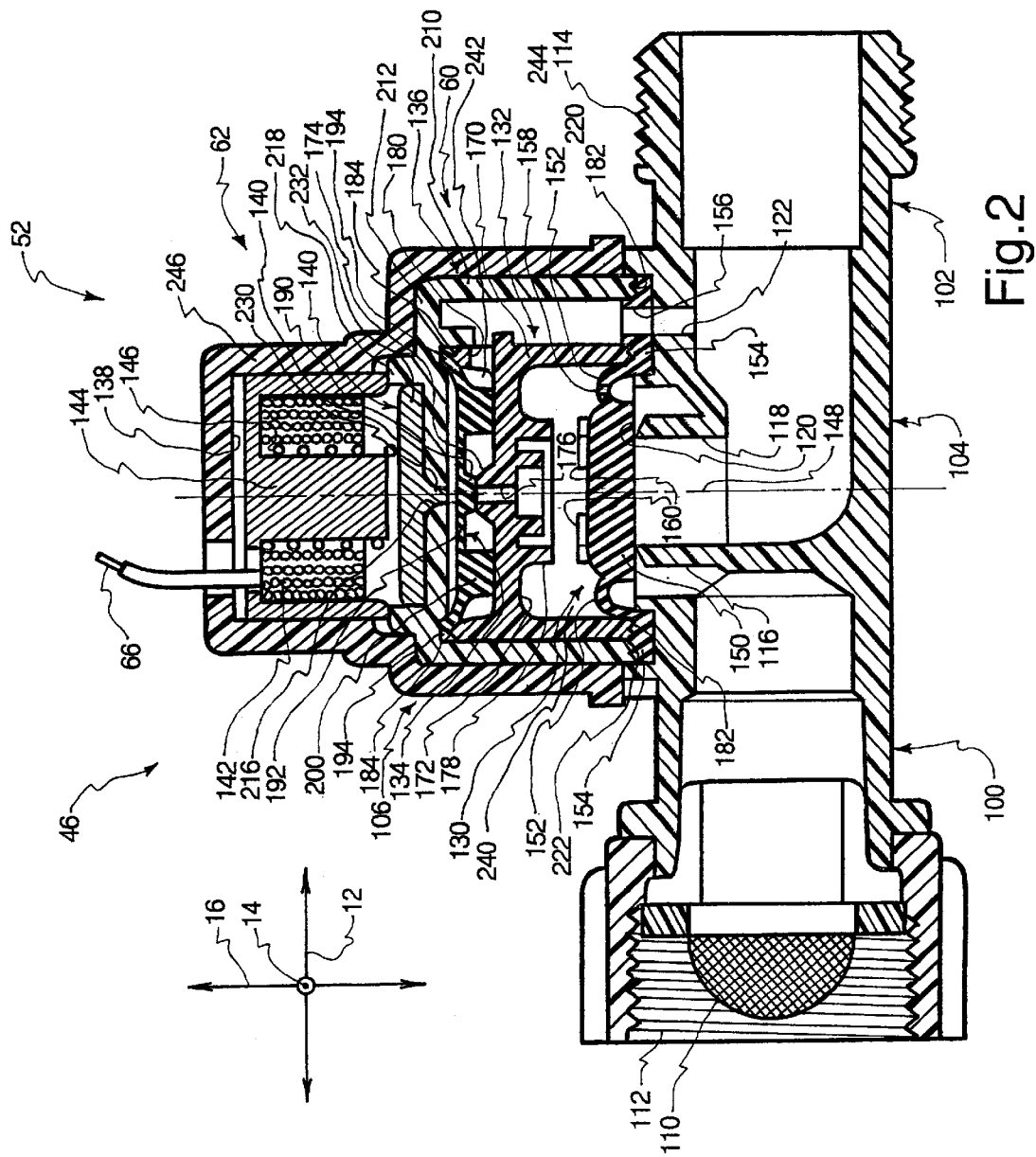
FIG. 2 is a side elevation, section view of the first valve assembly of the irrigation system of FIG. 1, with the first and second diaphragms open.

Referring to FIG. 2, a side elevation, section view depicts the first valve assembly 46 with the first valve 52 in the closed configuration to prevent water from entering the first distribution conduit 36 (shown in FIG. 1) from the feeder conduit 74 (also shown in FIG. 1). In addition to the first valve 52, the first valve assembly 46 has an inlet conduit 100 and an outlet conduit 102. The first valve 52 includes a conduit junction 104 disposed generally between the inlet conduit 100 and the outlet conduit 102. In this application, a "conduit junction" is any structure capable of conveying fluid between two or more conduits.

The inlet conduit 100 has a filter 110 designed to prevent debris and larger particulates from entering the first valve 52. The inlet conduit 100 is coupled to the feeder conduit 74 (FIG. 1), for example, through the use of interior threads 112. The outlet conduit 102 is coupled to the first distribution conduit 36 (FIG. 1), for example, via exterior threads 114. The inlet conduit 100, the outlet conduit 102, and the conduit junction 104 may optionally be integrally formed of a material such as plastic through a method such as injection molding. Alternatively, the inlet conduit 100, the outlet conduit 102, and the conduit junction 104 may be separately manufactured and then assembled together.

As shown, the conduit junction 104 has an annular passageway 116 in constant communication with the inlet conduit 100. The annular passageway 116 surrounds a primary outflow passageway 118 in communication with the outlet conduit 102. The primary outflow passageway 118 is separated from the annular passageway 116 by an annular lip 120. A secondary outflow passageway 122 is also formed in the conduit junction 104, in continuous communication with the outlet conduit 102.

The first valve 52 has a first diaphragm 130, an interior divider 132 disposed to hold the first diaphragm 130 against the conduit junction 104, a second diaphragm 134, and an interior retainer 136 disposed to hold the second diaphragm 134 against the interior divider 132. The first diaphragm 130, the interior divider 132, the second diaphragm 134, and the interior retainer 136 are disposed generally within the fluid transfer portion 60 of the first valve 52.

The actuator portion 62 has an actuator positioned adjacent to the interior retainer 136. In the embodiment depicted in FIG. 2, the actuator takes the form of a solenoid 138 with a bi-stable, linear output. However, an actuator within the scope of the invention may take a variety of forms, including a mono-stable linear solenoid, a rotary solenoid, a stepper or continuous output rotary motor, a piezoelectric actuator, or any other known electrically driven actuator.

As shown, the solenoid 138 includes a magnetically actuatable plunger 140 designed to be driven by an electric coil 142. The magnetically actuatable plunger 140 may be constructed of some type of low reluctance material, such as steel or iron. The electric coil 142 may be held in place by some type of potting, such as a ceramic encasement (not shown). The solenoid 138 includes a core 144, which may also be formed of a material with a low magnetic reluctance. A spring 146 is used to continuously bias the magnetically actuatable plunger 140 away from the core 144 and toward the interior retainer 136. The magnetically actuatable plunger 140, the coil 142, the core 144, and the spring 146 may be referred to as "component parts" of the solenoid 138.

The magnetically actuatable plunger 140 moves along an axis 148, which is substantially parallel to the transverse direction 16. In this application, "motion along an axis" refers to the axis along which the center of the object moves. If the object has a dominant circular form, the "center" is the center of that form. Otherwise, the "center" of the object is the center of mass of the object.

In this application, the term "diaphragm" refers to a structure capable of flexing significantly to alter the rate of fluid flow through an opening. "Flexing" refers to any type of bending, stretching, compression, twisting, or combinations thereof, regardless of whether the motion is toward or away from an undeflected configuration of the object in which they occur. Thus, motion back to an undeflected state, as well as motion away from the undeflected state, is included within the term "flexing."

The first diaphragm 130 may be constructed of a resilient material such as a rubber. According to one example, the resilient material is SANTOPRENE, which is available from Advanced Elastomer Systems of Akron, Ohio. The first diaphragm 130 has a blocking portion 150 designed to block water flow between the annular passageway 116 and the primary outflow passageway 118 by abutting the annular lip 120. A flexible rim 152 encircles the blocking portion 150. A peripheral flange 154, in turn, surrounds the flexible rim 152.

The flexible rim 152 has a small thickness and an extra length designed to permit flexure of the flexible rim 152. The flexible rim 152 flexes to move the blocking portion 150 toward or away from the annular lip 120 to block or permit water to flow between the annular passageway 116 and the primary outflow passageway 118. The flexible rim 152 may be generally bi-stable. Thus, the flexible rim 152 may be designed to hold the blocking portion 150 in either of two stable positions.

The stable positions are a closed position in which the blocking portion 150 abuts the annular lip 120, as depicted in FIG. 2, and an open position in which the blocking portion 150 rests away from the annular lip 120 and instead presses against the interior divider 132. The open and closed positions are stable because no external force, besides the normal forces provided by the annular lip 120 or the interior divider 132, are required to maintain them. When the first diaphragm 130 is in the open position, the first valve 52 is in the open configuration. Similarly, when the first diaphragm 130 is in the closed position, the first valve 52 is in the closed configuration.

The peripheral flange 154 has a generally circular perimeter with an extension through which an outflow passageway 156 is formed, in line with the secondary outflow passageway 122. The flexible rim 152 has a hole 158 with a comparatively small size to permit a measured quantity of water to flow from the annular passageway 116 through the flexible rim 152, regardless of whether the blocking portion 150 is in the open or closed position. The blocking portion 150 has a plurality of plateaus 160 that abut the interior divider 132 in the open position in a manner that will be depicted in greater detail subsequently. The interior divider 132 has an annular wall 170 that generally encircles the blocking portion 150 and the flexible rim 152 of the first diaphragm 130. Furthermore, the interior divider 132 has a flat wall 172 disposed generally along a plane parallel to the blocking portion 150, through the interior of the annular wall 170. The flat wall 172 has a plateau 174 that extends toward the second diaphragm 134. An orifice 176 is formed in the flat wall 172, through the plateau 174. The flat wall 172 also has a plurality of annular abutments 178 that extend toward the first diaphragm 130 and encircle the axis of the orifice 176. The annular abutments 178 serve as abutments against which the blocking portion 150 can rest so that, in the open position, flexure and corresponding mechanical stress within the first diaphragm 130 is limited. The plateaus 160 of the blocking portion 150 abut the annular abutments 178 in such a manner that water is still able to reach the orifice 176 from the space between the first diaphragm 130 and the interior divider 132 when the first diaphragm 130 is in the open position.

An outflow passageway 180 is formed in the annular wall 170, in the portion of the annular wall 170 that lies adjacent to the interior retainer 136. The outflow passageway 180 permits water to exit the space between the second diaphragm 134 and the interior divider 132 to reach the outflow passageway 122 of the conduit junction 104.

The annular wall 170 presses in the transverse direction 16 against the peripheral flange 154 of the first diaphragm 130 to hold the first diaphragm 130 in place against the conduit junction 140. Annular ridges 182 are formed in the corresponding end of the annular wall 170 to ensure that water is unable to escape from the space between the first diaphragm 130 and the interior divider 132 through the junction between the annular wall 170 and the peripheral flange 154.

The annular wall 170 is pressed against the second diaphragm 134 in the transverse direction 16, in a similar fashion. An annular ridge 184 is formed in the corresponding end of the annular wall 170 to ensure that water is unable to escape from the space between the second diaphragm 134 and the interior divider 132 through the junction between the annular wall 170 and the second diaphragm 134.

The second diaphragm 134 has a blocking portion 190 designed to abut the orifice 176 to substantially prevent water flow through the orifice 176. In this application, "abutting" an orifice refers to directly contacting the interior wall of the orifice or the region surrounding one end of the orifice to block fluid flow through the orifice. The blocking portion 190 extends toward the orifice 176 from a flexible membrane 192 with a generally thin, circular shape. A peripheral flange 194 generally encircles the flexible membrane 192.

The peripheral flange 194 is sandwiched between the annular wall 170 of the interior divider 132 and the interior retainer 136. Hence, the peripheral flange 194 performs a function similar to that of the peripheral flange 154 of the first diaphragm 130 by anchoring and sealing the edges of the second diaphragm 134.

The flexible membrane 192 is thin enough to stretch into a slight dome shape in response to pressure from the magnetically actuatable plunger 140. Thus, like the first diaphragm 130, the second diaphragm 134 is able to flex between an open configuration and a closed configuration. In the open configuration, the blocking ;portion 190 is withdrawn from the orifice 176 to permit water to pass through the orifice 176. In the closed configuration, the blocking portion 190 is pressed, against the plateau 174 of the interior divider 132 to block water flow through the orifice 176.

Unlike the first diaphragm 130, the second diaphragm 134 is not bi-stable. Rather, the second diaphragm 134 tends to return to the open configuration in the absence of pressure from the magnetically actuatable plunger 140 to urge the second diaphragm 134 to remain in the closed configuration. In FIG. 2, the second diaphragm 134 is in the closed position.

In the event that the pressure within the outlet conduit 102 is low compared with that of the actuator portion 62, the second diaphragm 134 may tend to "stick" in the closed position despite retraction of the magnetically actuatable plunger 140. In order to ensure that retraction to the open position occurs, the second diaphragm 134 is also provided with a peripheral ring 200 that extends toward the interior divider 132 from the flexible membrane 192.

In the closed configuration, the peripheral ring 200 presses against the flat wall 172 of the interior divider 132, surrounding the plateau 174. The peripheral ring 200 forms a seal so that the region surrounding the orifice 176 is not subject to the lower pressure of the outlet conduit 102. The result is that the vacuum effect tending to keep the second diaphragm 134 in the closed position is weakened so that the second diaphragm 134 is able to return to the open position.

The interior retainer 136 has an annular wall 210 that generally encircles the interior divider 132, the first diaphragm 130, and the second diaphragm 134. The interior retainer 136 also has a flat wall 212 that generally separates the fluid transfer portion 60 from the actuator portion 62. The flat wall 212 has an aperture 216 aligned with the blocking portion 190 of the second diaphragm 134.

Furthermore, the interior retainer 136 has an annular plunger receptacle 218 that extends from the flat wall 212 to generally encircle the magnetically actuatable plunger 140. The annular plunger receptacle 218 may help to constrain motion of the magnetically actuatable plunger 140 to the transverse direction 16 by keeping the magnetically actuatable plunger 140 generally parallel to the flat wall 212.

The annular wall 210 of the interior retainer 136 does not extend full circle around the interior divider 132. Rather, the annular wall 210 has a break that overlies the side of the interior divider 132 in which the outflow passageway 180 is formed. The annular wall 210 further has an arcuate extension 220 that extends outward from the outflow passageway 180 to provide a space for water to flow between the arcuate extension 220 and the adjacent portion of the annular wall 170 of the interior divider 132. Water is thus able to flow through the outflow passageway 180 of the interior divider 132, through the outflow passageway 156 of the first diaphragm 130, and through the secondary outflow passageway 122 of the conduit junction 104 to reach the outlet conduit 102.

The annular wall 210 and the arcuate extension 220 press against the peripheral flange 154 of the first diaphragm 130 to aid in holding the first diaphragm 130 in place and also to seal the spaces between the interior divider 132 and the interior retainer 136. Generally annular ridges 222 press into the peripheral flange 154 to prevent water leakage through the junction between the annular wall 210, the arcuate extension 220, and the peripheral flange 154. The ridges 222 are not exactly annular because they extend along the arcuate extension 220 as well as the annular wall 210.

The magnetically actuatable plunger 140 has a post 230 designed to extend through the aperture 216 of the interior retainer 136 to contact the second diaphragm 134. Additionally the magnetically actuatable plunger 140 has a disk 232 with a comparatively wide diameter designed to provide a low reluctance flux path. The disk 232 seats within the annular plunger receptacle 218 of the interior retainer 136 in such a manner that the magnetically actuatable plunger 140 is only able to translate along the transverse direction 16.

The aperture 216 need not form a seal around the post 230. Rather, the peripheral flange 194 of the second diaphragm 134 forms a seal with the interior retainer 136 that keeps irrigation water from entering the space between the interior retainer 136 and the second diaphragm 134. Thus, no part of the solenoid 138 is exposed to the irrigation water. Hence, the magnetically actuatable plunger 140, the core 144, and other parts of the solenoid 138 may be constructed of conventional metals rather than corrosion resistant materials. Consequently, the solenoid 138 may be economically manufactured. Additionally, there is little danger of failure of the solenoid 138 due to corrosion or particulate interference.

As shown, the first diaphragm 130 and the interior divider 132 interact to define a first chamber 240. Similarly, the interior divider 132 and the second diaphragm 134 interact to define a second chamber 242. The interior divider 132 also interacts with the arcuate extension 220 of the interior retainer 136 to define a venting passageway 244 capable of conveying water from the outflow passageway 180 of the interior divider 132 to the outflow passageway 156 of the first diaphragm 130. In this application, "defining" a chamber or passageway refers to forming at least a portion of a boundary of the chamber or passageway.

A cap 246 is attached to the conduit junction 104 such that the cap 246 generally contains the first diaphragm 130, the interior divider 132, the second diaphragm 134, the interior retainer 136, and the solenoid 138. The cap 246 serves to protect the interior elements of the first valve 52 from interference from exterior objects. If desired, the cap 246 may optionally be used to seal the solenoid 138 from gases outside the first valve 52.

Water flow through the first chamber 240, the second chamber 242, and the venting passageway 244 is controlled in a manner that enables flexure of the second diaphragm 134 to trigger flexure 130 of the first diaphragm 130. More precisely, when the first valve 52 is in the steady state closed configuration illustrated in FIG. 2, the first and second diaphragms 130, 134 are both in the closed position. Hence, the first and second chambers 240, 242 are generally sealed from each other.

The first diaphragm 130 prevents water to flow from the annular passageway 116 to the primary outflow passageway 118. The first chamber 240 is in fluid communication with the inlet conduit 100 via the hole 158 of the first diaphragm 130. However, since water is unable to exit the first chamber 240, there is little fluid motion through the hole 158.

The second chamber 242 is in continual communication with the venting passageway 244 and the outlet conduit 102. The second chamber 242, the venting passageway 244, and the outlet conduit 102 are all generally free of water due to the fact that the primary outflow passageway 118 and the orifice 176 are sealed by the first and second diaphragms 130, 134, respectively.

As mentioned previously, the solenoid 138 is a bi-stable type solenoid. The spring 146 helps to provide the bi-stable positioning of the magnetically actuatable plunger 140. Hence, the magnetically actuatable plunger 140 remains extended to press the blocking portion 190 of the second diaphragm 134 against the plateau 174 of the interior divider 132 in the absence of any electric signal from the first valve wires 66. However, when the timer 90 provides an activation signal, the electric coil 142 generates a magnetic field that retracts the magnetically actuatable plunger 140. The post 230 withdraws at least partially from the aperture 216 to penmit the second diaphragm 134 to flex back to the open position. The resulting valve configuration is depicted in FIG. 3.

Figure 3:
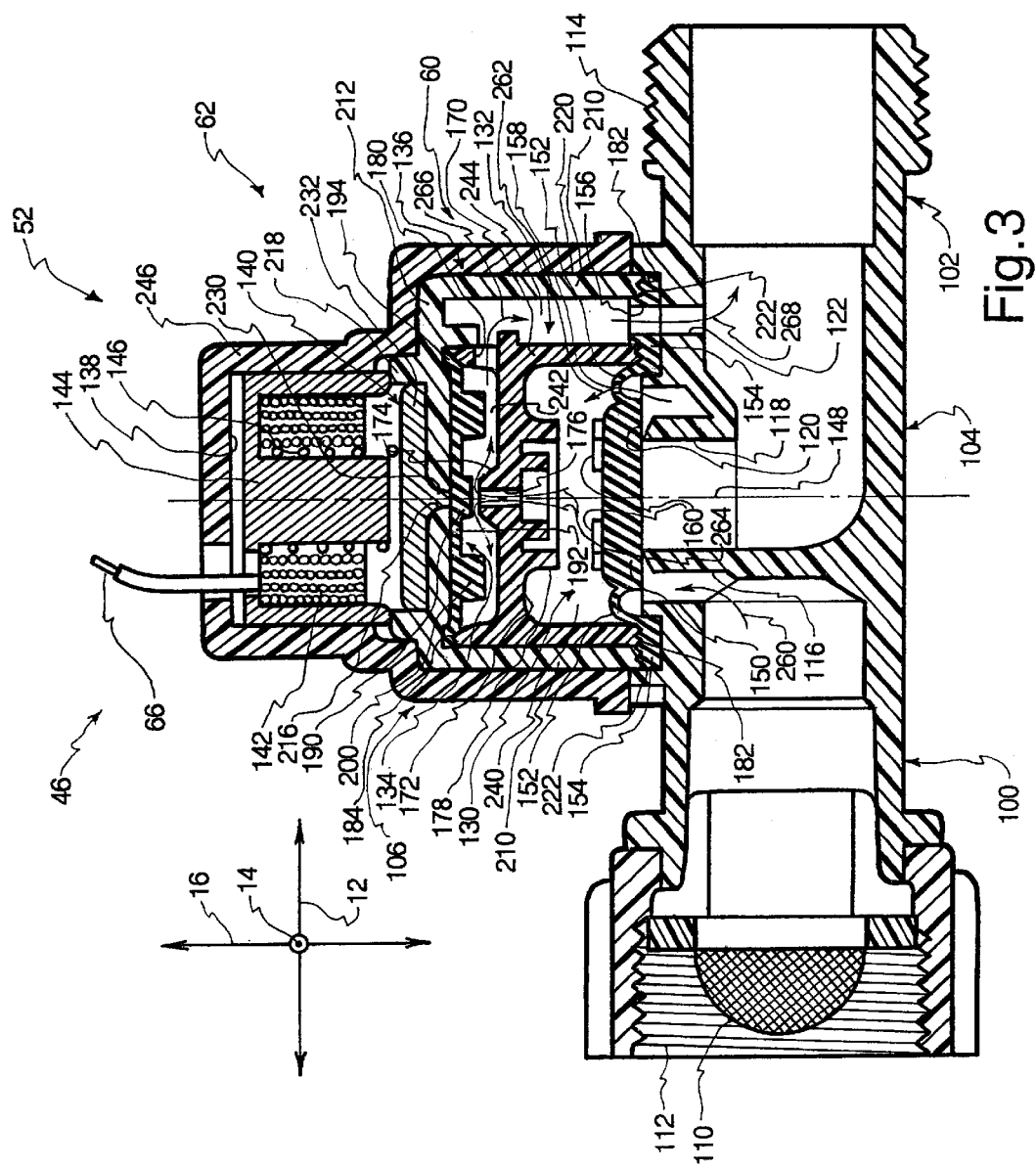
FIG. 3 is a side elevation, section view of the first valve assembly of the irrigation system of FIG. 1, with the second diaphragm open-to urge the first diaphragm to open.

Referring to FIG. 3, a side elevation, section view depicts the first valve assembly 46 immediately after retraction of the magnetically actuatable plunger 140 and relaxation of the second diaphragm 134. The first valve 52 is still in the closed configuration because the first diaphragm 130 is still disposed in the closed position. Hence, water is unable to flow from the annular passageway 116 into the primary outflow passageway 118.

However, the orifice 176 has been unblocked to permit water communication between the first chamber 240 and the second chamber 242. In this application, "water communication" and "fluid communication" refer to the ability of fluids to pass between two regions, such as the first and second chambers 240, 242.

Because the orifice 176 is unblocked to release water into the second chamber 242, the first chamber 240 is able to receive more water. As illustrated, water enters the annular passageway 116 from the inlet conduit 100, as depicted by the arrow 260. Water then flows from the annular passageway 116 into the first chamber 240 via the hole 158 in the flexible rim 158 of the first diaphragm 130, as shown by the arrow 262.

Simultaneously, water passes from the first chamber 240 to the second chamber 242 through the orifice 176, as illustrated by the arrows 264. The water exits the second chamber 242 via the outflow passageway 180, as illustrated by the arrow 266. The water moves through the venting passageway 244 and passes through the outflow passageway 156 of the first diaphragm 130 and the secondary outflow passageway of the conduit junction 104 to reach the outlet conduit 102, as depicted by the arrow 268.

As mentioned previously, the hole 158 is sized to restrict the flow rate of water into the first chamber 240 from the annular passageway 116. The orifice 176 is not large, but is less restrictive than the hole 158. Thus, water is able to exit the first chamber 240 through the orifice 176 at a flow rate higher than the flow rate of water entering the first chamber 240 via the hole 158. Thus, the pressure within the first chamber 240 is reduced.

The difference between the pressure within the annular passageway 116 and the pressure within the first chamber 240 increases until the pressure differential is sufficient to press the blocking portion 150 of the first diaphragm 130 away from the annular lip 120. Thus, the first diaphragm moves to the open position. The resulting valve configuration is illustrated in FIG. 4.

Figure 4:
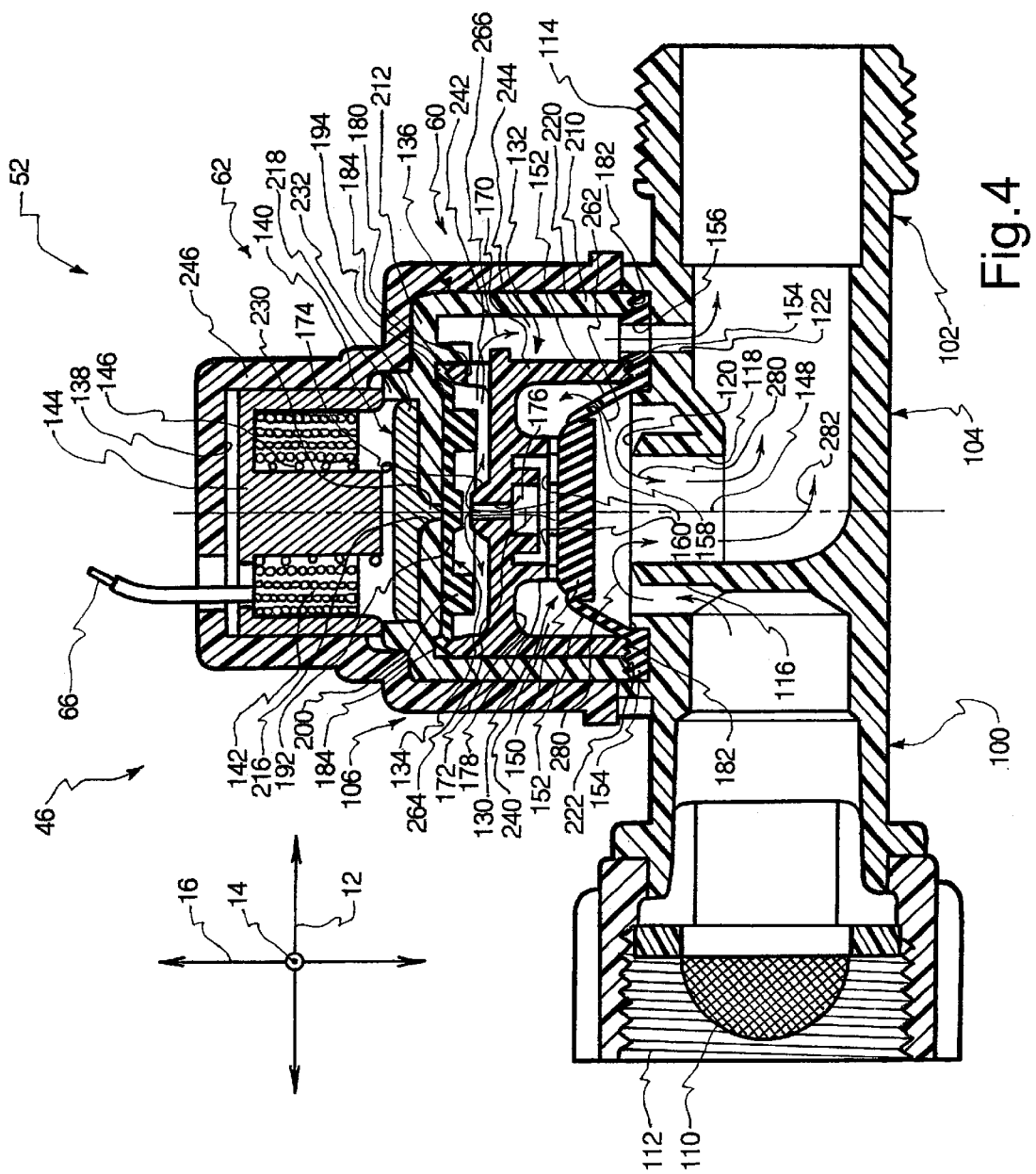
FIG. 4 is a side elevation, section view of the first valve assembly of the irrigation system of FIG. 1, with the first and second diaphragms open.

Referring to FIG. 4, a side elevation, section view depicts the first valve assembly 46 after movement of the first diaphragm 130 to the open position. Water is now able to flow inward from the annular passageway 116 to enter the primary. outflow passageway 118, as depicted by the arrows 280. The water can then flow into the outlet conduit 102 from the primary outflow passageway 118, as shown by the arrows 282.

The first diaphragm 130 remains open as long as the orifice 176 remains unblocked. Since the solenoid 138 is bi-stable, the magnetically actuatable plunger 140 remains retracted until current is applied through the first valve wires 66. Until then, irrigation water flows relatively freely between the inlet conduit 100 and the outlet conduit 102.

When the first valve 52 is to be returned to the closed configuration, the timer 90 again transmits an activation signal through the first valve activation wires 66. In response, the electric coil 142 energizes to create a magnetic field that extends the magnetically actuatable plunger 140. The magnetically actuatable plunger 140 extends such that the post 230 presses against the second diaphragm 134 to urge the blocking portion 190 to move toward the orifice 176. The blocking portion 190 presses against the plateau 174 to block water flow through the orifice 176. The resulting valve configuration is illustrated in FIG. 5.

Figure 5:
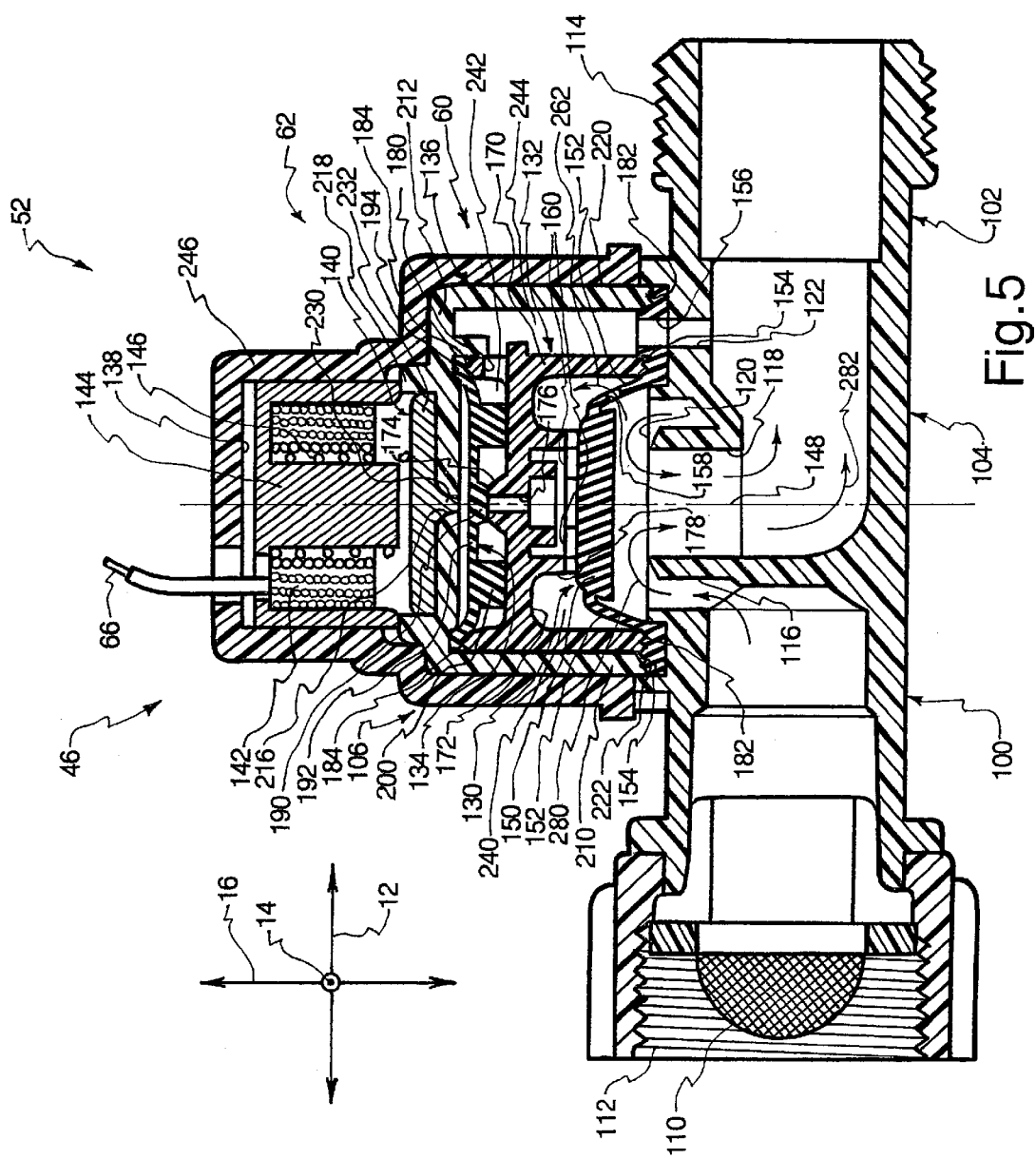
FIG. 5 is a side elevation, section view of the first valve assembly of the irrigation system of FIG. 1, with the second diaphragm closed to urge the first diaphragm to close.

Referring to FIG. 5, a side elevation, section view depicts the first valve assembly 46 immediately after extension of the magnetically actuatable plunger 140 and closing of the second diaphragm 134. The first valve 52 is still in the open configuration because the first diaphragm 130 is still disposed in the open position. Hence, water continues to flow from the annular passageway 116 into the primary outflow passageway 118.

However, water is no longer able to pass from the first chamber 240 to the second chamber 242. Thus, water pressure within the first chamber 240 builds up due to the continued entry of water into the first chamber 240 via the hole 158. Water pressure between the blocking portion 150 and the primary outflow passageway 118 remains at a comparatively lower level because the primary outflow passageway 118 is in communication with the outlet conduit 102, which is at low pressure.

The water pressure within the first chamber 240 soon reaches a level sufficient to press the first diaphragm 130 back to the closed position. The first valve 52 then once again reaches the configuration depicted in FIG. 2, in which water is unable to flow into the outlet conduit 102 via the primary outflow passageway 118 or the secondary outflow passageway 122.

The first valve assembly 46 may be manufactured in a comparatively easy and inexpensive manner. According to one manufacturing method, the inlet conduit 100, the outlet conduit 102, and the conduit junction 104 are first formed in integral fashion through the use of an injection molding operation or the like. Additional operations such as punching, tapping, or the like may also be performed to obtain the desired configurations for the inlet conduit 100, the outlet conduit 102, and the conduit junction 104. As mentioned previously, the inlet conduit 100, the outlet conduit 102, and the conduit junction 104 may be formed of a material such as plastic. In the alternative, metals, ceramics, composites, and the like may be used.

The interior divider 132, the interior retainer 136, and the cap 246 may also be formed of plastics through molding operations or the like. The interior divider 132, the interior retainer 136, and the cap 246 may also be formed of other materials if desired. The first and second diaphragms 130, 134 may also be formed through the use of molding operations. An elastomeric material such as SANTOPRENE may be used. The various parts of the solenoid 138 may be manufactured through the use of known solenoid manufacturing methods.

The first diaphragm 130 is first inserted into engagement with the conduit junction 104. "Engagement" refers to a relationship in which one object is retained by another, with or without direct contact between the objects. In alternative embodiments, other objects such as seals and fasteners (not shown) may be interposed between the conduit junction 104 and the first diaphragm 104, if desired.

The peripheral flange 154 is thus inserted into the depicted annular alcove of the first diaphragm 130. Then, the interior divider 132 is positioned adjacent to the first diaphragm 130 such that the annular wall 170 encircles the flexible rim 152 and the annular ridges 182 press into the peripheral flange 154. The second diaphragm 134 is then disposed adjacent to the interior divider 132 such that the annular ridge 184 presses into the peripheral flange 194 of the second diaphragm 134.

The interior retainer 136 is then disposed such that the annular wall 210 generally encircles the blocking portion 150 and the flexible rim 152 of the first diaphragm 130, the interior divider 132, and the second diaphragm 134. The interior retainer 136 is first rotated to such an orientation that the break in the annular wall 210 is aligned with the outflow passageway 180. The generally annular ridges 222 of the annular wall 210 and the arcuate extension 220 press against the peripheral flange 154.

The solenoid 138 is then positioned outside the flat wall 212 of the interior retainer 136. According to one example, the magnetically actuatable plunger 140 is separate from the remainder of the solenoid 138, and may thus be inserted first into the annular plunger receptacle 218 of the interior retainer 136. Then, the remainder of the solenoid 138 is simply aligned with the magnetically actuatable plunger 140 and disposed to abut the annular plunger receptacle 218. The first valve wires 66 are connected to the electric coil 142.

The cap 246 is then rotationally aligned with the other components of the first valve 52 and inserted such that the cap 246 contains the first diaphragm 130, the interior divider 132, the second diaphragm 134, the interior retainer 136, and the solenoid 138. The first valve wires 66 extend through an opening in the end of the cap 246. The cap 246 abuts the conduit junction 104 and may be attached to the conduit junction 104 through the use of fasteners (not shown), welding, or any other technique. The first valve assembly 46 is then ready for use, and may be used independently or may be incorporated into a manifold like the manifold 72 of FIG. 1.

Beneficially, several components of the first valve 52 are disposed along a common axis. For example, each of the first and second diaphragms 130, 134 has a generally circular shape. "Generally circular" includes shapes in which there is some aberration from circularity, such as the extended portion of the peripheral flange 154 of the first diaphragm 130 in which the outflow passageway 156 is located.

The centers of the first and second diaphragms 130, 134 both disposed on the axis 148 along which the magnetically actuatable plunger 140 travels, and the first and second diaphragms 130, 134 also move along the axis 148. Furthermore, the primary outflow passageway 118, the orifice 176, and the core 144 all have centers disposed on the axis 148. In this application, disposition "on an axis" does not require precise alignment of the center of the object or feature with the axis; rather some variation from precise alignment is permitted to account for normal fabrication tolerances, assembly positioning tolerances, and the like.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A valve for controlling a flow of irrigation water, the valve having an open configuration that permits water flow to a water distribution unit and a closed configuration that substantially blocks water flow to the water distribution unit, the valve comprising:
   a first diaphragm that is flexible to move the valve between the open configuration and the closed configuration; and
   a magnetically actuated plunger that triggers motion of the first; diaphragm by moving along an axis intersecting the first diaphragm, wherein the magnetically actuated plunger is substantially isolated from water.

2. The valve of claim 1, wherein the magnetically actuated plunger is a component part of a solenoid substantially isolated from water.

3. The valve of claim 1, further comprising a second diaphragm disposed to be flexed by the magnetically actuated plunger to initiate motion of the first diaphragm.

4. The valve of claim 3, further comprising an interior divider having an orifice, wherein the interior divider is disposed between the first and second diaphragms to form a first chamber defined at least in part by the first diaphragm and a second chamber defined at least in part by the second diaphragm such that the second diaphragm is flexible to abut the orifice to block water communication between the first and second chambers.

5. The valve of claim 4, further comprising an interior retainer disposed between the second diaphragm and the magnetically actuated plunger, the interior retainer having an aperture through which the magnetically actuated plunger extends to contact the second diaphragm.

6. The valve of claim 4, wherein the first diaphragm comprises a hole disposed to permit water entry into the first chamber in the open and closed configurations, wherein flexure of the second diaphragm to unblock the orifice releases water from the first chamber to decrease water pressure within the first chamber, thereby inducing flexure of the first diaphragm to move the valve to the open configuration.

7. The valve of claim 6, wherein the second diaphragm comprises a central portion that abuts the orifice and a peripheral ring that presses against the interior divider to isolate the central portion from low outlet pressure.

8. The valve of claim 4, wherein the first diaphragm, the second diaphragm, and the orifice are generally circular in shape, and wherein each of the first diaphragm, the second diaphragm, and the orifice has a center disposed on the axis.

9. The valve of claim 1, further comprising:
   a conduit junction disposed to convey water to the water distribution unit; and
   a cap attached to the conduit junction to cover the magnetically actuated plunger and the first diaphragm.

10. A valve assembly for controlling a flow of irrigation water to at least one water distribution unit, the valve assembly comprising:
    an inlet conduit that receives water;
    an outlet conduit in communication with the water distribution unit; and
    a valve comprising a first diaphragm, a second diaphragm, and an interior divider having an orifice, wherein the first diaphragm is flexible to move the valve between an open configuration that permits water flow between the inlet conduit and the outlet conduit and a closed configuration that substantially blocks water flow between the inlet conduit and the outlet conduit, wherein the second diaphragm is flexible to abut the orifice to trigger flexure of the first diaphragm to move the valve to the closed configuration.

11. The valve assembly of claim 10, wherein the valve further comprises a solenoid substantially isolated from water, the solenoid having a magnetically actuated plunger disposed to drive flexure of the second diaphragm.

12. The valve assembly of claim 11, wherein the valve further comprises an interior retainer disposed between the second diaphragm and the magnetically actuated plunger, the interior retainer having an aperture through which the magnetically actuated plunger extends to contact the second diaphragm.

13. The valve assembly of claim 12, wherein the first diaphragm, the second diaphragm, and the orifice are generally circular in shape, and wherein each of the first diaphragm, the second diaphragm, and the orifice has a center disposed on an axis along which the magnetically actuated plunger is movable.

14. The valve assembly of claim 10, wherein the valve comprises a first chamber defined at least in part by the first diaphragm and a second chamber defined at least in part by the second diaphragm, wherein the second diaphragm is shaped such that abutting the orifice with the second diaphragm blocks water communication between the chambers.

15. The valve assembly of claim 14, wherein the first diaphragm comprises a hole disposed to permit water entry into the first chamber in the open and closed configurations, wherein flexure of the second diaphragm to unblock the orifice releases water from the first chamber to decrease water pressure within the first chamber, thereby inducing flexure of the first diaphragm to move the valve to the open configuration.

16. The valve assembly of claim 15, wherein the second diaphragm comprises a central portion that abuts the orifice and a peripheral ring that presses against the interior divider to isolate the central portion from low pressure within the outlet conduit.

17. A manifold for controlling flows of irrigation water to at least two water distribution units, the manifold comprising:
    a feeder conduit that receives water from a main line;
    a plurality of inlet conduits, each of which is coupled to the feeder conduit to receive water from the feeder conduit;
    a plurality of outlet conduits; and
    a plurality of valves, each of which has an open configuration that permits water flow from one of the inlet conduits to one of the outlet conduits and a closed configuration that substantially blocks water flow from the inlet conduit to the outlet conduit, each valve comprising a first diaphragm, a second diaphragm, and an interior divider having an orifice, wherein in the open configuration the orifice is unobstructed to permit water communication between a first chamber defined at least in part by the first diaphragm and a second chamber defined at least in part by the second diaphragm, and wherein obstruction of the orifice initiates motion of the first diaphragm to move the valve to the closed configuration.

18. The manifold of claim 17, wherein each valve further comprises an a solenoid substantially isolated from water, the solenoid having a magnetically actuated plunger disposed to drive flexure of the second diaphragm.

19. The manifold of claim 18, wherein each valve further comprises an interior retainer disposed between the second diaphragm and the magnetically actuated plunger, the interior retainer having an aperture through which the magnetically actuated plunger extends to contact the second diaphragm.

20. The manifold of claim 19, wherein the first diaphragm, the second diaphragm, and the orifice are generally circular in shape, and wherein each of the first diaphragm, the second diaphragm, and the orifice has a center disposed on an axis along which the magnetically actuated plunger is movable.

21. The manifold of claim 17, wherein the second diaphragm is disposed to abut the orifice to obstruct the orifice, thereby blocking water communication between the first and second chambers.

22. The manifold of claim 21, wherein the first diaphragm comprises a hole disposed to permit water entry into the first chamber in the open and closed configurations, wherein flexure of the second diaphragm to unblock the orifice releases water from the first chamber to decrease water pressure within the first chamber, thereby inducing flexure of the first diaphragm to move the valve to the open configuration.

23. The manifold of claim 22, wherein the second diaphragm comprises a central portion that abuts the orifice and a peripheral ring that presses against the interior divider to isolate the central portion from low pressure within the outlet conduit.

24. An irrigation system configured to irrigate an area, the irrigation system comprising:
    at least one water distribution unit that distributes water over at least a portion of the area;

at least one distribution conduit, each distribution conduit conveying water to at least one water distribution unit;

at least one valve comprising a first diaphragm that is flexible to move the valve between an open configuration that permits water flow into one of the distribution conduits and a closed configuration that substantially blocks water flow into the distribution conduit, wherein motion of the first diaphragm is triggered by motion of a magnetically actuated plunger along an axis intersecting the first diaphragm, wherein the magnetically actuated plunger is substantially isolated from water; and a control unit that transmits valve activation signals to initiate motion of the magnetically actuated plunger of each valve.

25. The irrigation system of claim 24, wherein the magnetically actuated plunger is a component part of a solenoid substantially isolated from water.

26. The irrigation system of claim 24, wherein the valve further comprises a second diaphragm disposed to be flexed by the magnetically actuated plunger to initiate motion of the first diaphragm and an interior divider having an orifice, wherein the first diaphragm, the second diaphragm, and the orifice are generally circular in shape, and wherein each of the first diaphragm, the second diaphragm, and the orifice has a center disposed on the axis.

27. An irrigation system configured to irrigate an area, the irrigation system comprising:

at least one water distribution unit that distributes water over at least a portion of the area;

at least one distribution conduit, each distribution conduit conveying water to at least one water distribution unit;

at least one valve having an open configuration that permits water flow into one of the distribution conduits and a closed configuration that substantially blocks water flow into the distribution conduit, the valve comprising a first diaphragm, a second diaphragm, and an interior divider having an orifice, wherein in the open configuration the orifice is unobstructed to permit water communication between a first chamber defined at least in part by the first diaphragm and a second chamber defined at least in part by the second diaphragm, and wherein obstruction of the orifice initiates motion of the first diaphragm to move the valve to the closed configuration; and a control unit that transmits valve activation signals to initiate obstruction of the orifice of each valve.

28. The irrigation system of claim 27, wherein the valve further comprises an a solenoid substantially isolated from water, the solenoid having a magnetically actuated plunger disposed to drive flexure of the second diaphragm.

29. The irrigation system of claim 27, wherein the second diaphragm is disposed to abut the orifice to obstruct the orifice, thereby blocking water communication between the first and second chambers.

30. A method for assembling a valve for controlling irrigation water flow between an inlet conduit and an outlet conduit, the valve having an open configuration that permits water flow between the inlet conduit and the outlet conduit and a closed configuration that substantially blocks water flow between the inlet conduit and the outlet conduit, the valve comprising a conduit junction disposed to convey water between the inlet and outlet conduits, a first diaphragm, and a second diaphragm, the method comprising:

inserting the first diaphragm into engagement with the conduit junction such that the first diaphragm is flexible to move the valve between the open and closed configurations; and disposing the magnetically actuated plunger and the second diaphragm such that the magnetically actuated plunger is movable along an axis intersecting the first diaphragm to trigger motion of the first diaphragm via flexure of the second diaphragm.

31. The method of claim 30, further comprising positioning an interior divider to abut a peripheral flange of the first diaphragm such that the interior divider cooperates with the conduit junction to retain the first diaphragm.

32. The method of claim 31, wherein disposing the magnetically actuated plunger and the second diaphragm comprises positioning the second diaphragm such that a peripheral flange of the second diaphragm abuts the interior divider.

33. The method of claim 32, further comprising positioning an interior retainer to abut the peripheral flange of the second diaphragm such that the interior retainer cooperates with the interior divider to retain the second diaphragm.

34. The method of claim 33, wherein the interior retainer comprises an aperture, the method further comprising disposing a solenoid such that a magnetically actuatable plunger of the solenoid extends into the aperture.

35. The method of claim 34, further comprising attaching a cap to the conduit junction to keep the diaphragms, the interior divider, the interior retainer, and the solenoid in place.

36. The method of claim 32, wherein the interior divider comprises an orifice, wherein the first diaphragm, the second diaphragm, and the orifice are generally circular in shape, wherein inserting the first diaphragm, positioning the interior divider, and positioning the second diaphragm comprises disposing centers of the first diaphragm, the second diaphragm, and the orifice on the axis.

37. A method for moving a valve from an open configuration that permits water flow between an inlet conduit and an outlet conduit and a closed configuration that substantially blocks water flow between the inlet conduit and the outlet conduit, the valve having a first diaphragm, a second diaphragm, and an interior divider having an orifice, the method comprising:

flexing the second diaphragm to abut the orifice of the interior divider, thereby substantially blocking the orifice; and flexing the first diaphragm in response to blockage of the orifice to move the valve from the open configuration to the closed configuration.

38. The method of claim 37, further comprising moving a plunger of a solenoid to trigger flexure of the second diaphragm to abut the orifice.

39. The method of claim 38, wherein moving the plunger comprises extending the plunger through a hole of an interior retainer disposed between the plunger and the second diaphragm.

40. The method of claim 37, wherein the second diaphragm comprises a central portion that abuts the orifice and a peripheral ring, the method further comprises pressing the peripheral ring against the interior divider to isolate the central portion from low pressure within the outlet conduit.

* * * * *

UNITED STATES PATENT AND TRADEMARK OFFICE
CERTIFICATE OF CORRECTION

PATENT NO. : 6,749,136 B1
DATED : June 15, 2004
INVENTOR(S) : Chadwick L. Wilson et al.

It is certified that error appears in the above-identified patent and that said Letters Patent is hereby corrected as shown below:

Column 3,
Line 49, please insert a comma after "water", change "Thus" to -- thus --, and remove the comma after "thus".
Line 50, please insert a period after "produced".

Column 5,
Line 45, replace "penmitted" with -- permitted --.
Line 60, replace "tern" with -- term --.

Signed and Sealed this

Twenty-sixth Day of April, 2005

JON W. DUDAS
*Director of the United States Patent and Trademark Office*